Nov. 7, 1939.  A. COHEN ET AL  2,178,559
FLUID DISPENSING SYSTEM
Filed June 12, 1937  3 Sheets-Sheet 2
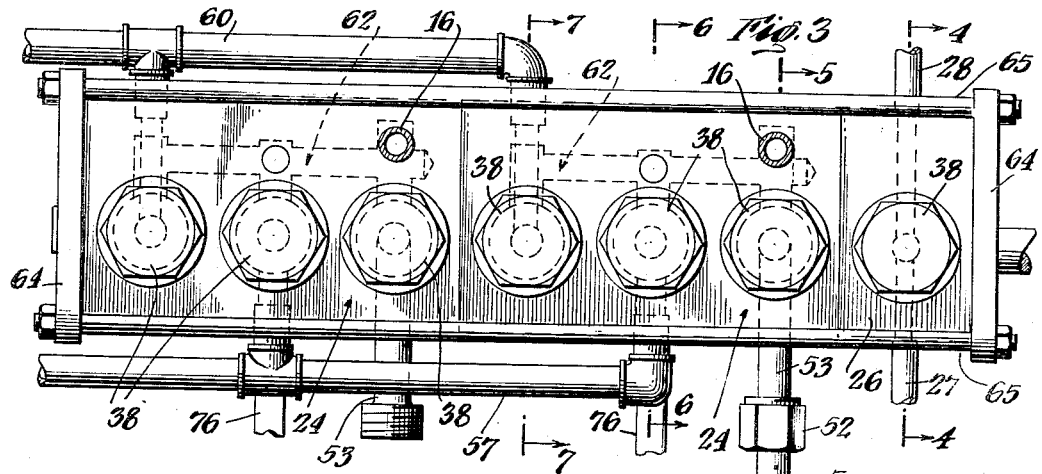
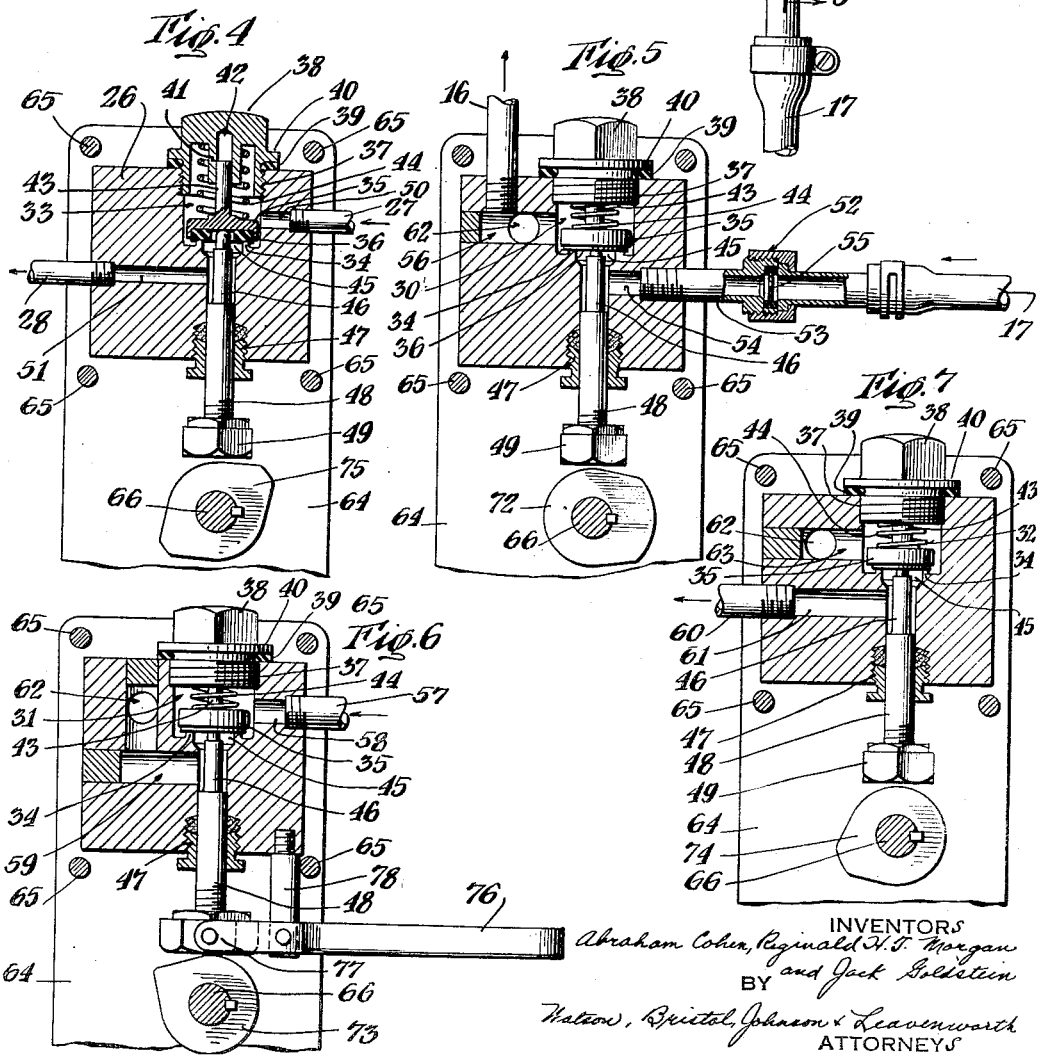
INVENTORS
Abraham Cohen, Reginald H. T. Morgan
and Jack Goldstein
BY
Watson, Bristol, Johnson & Leavenworth
ATTORNEYS Nov. 7, 1939.  A. COHEN ET AL  2,178,559
FLUID DISPENSING SYSTEM
Filed June 12, 1937 3 Sheets-Sheet 3
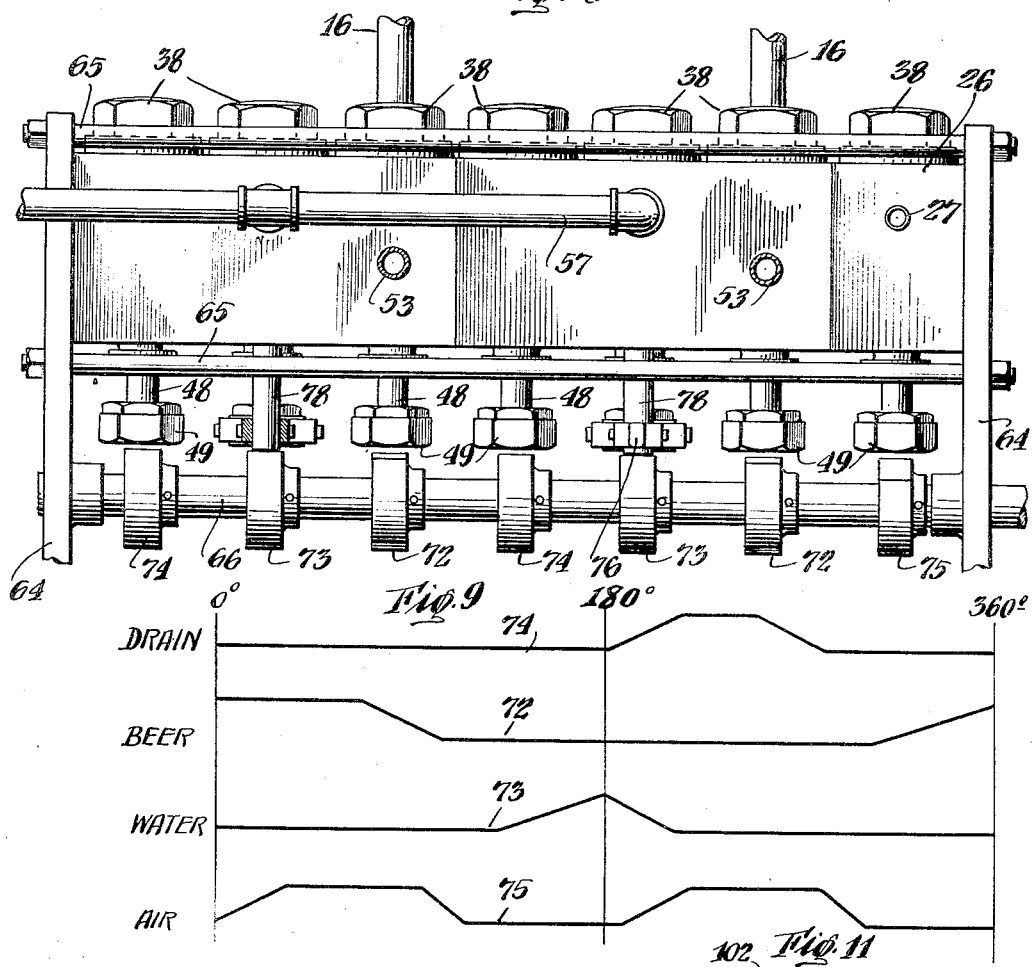
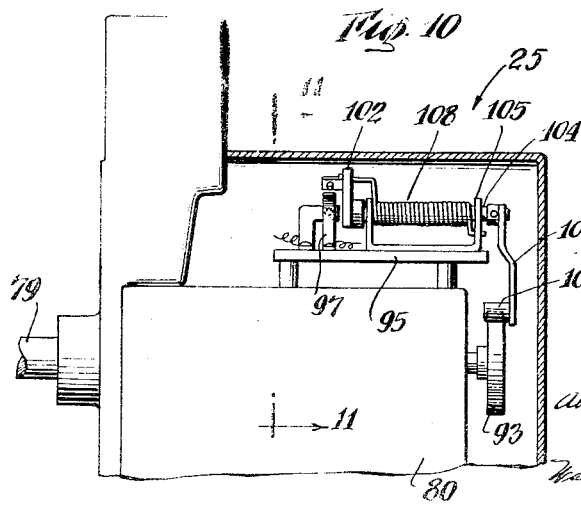
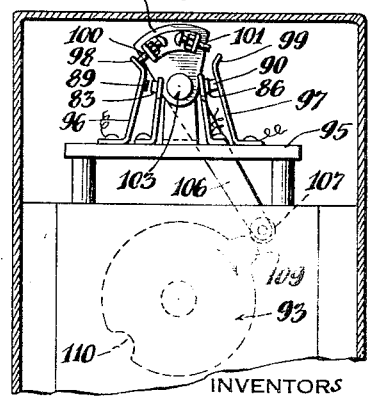

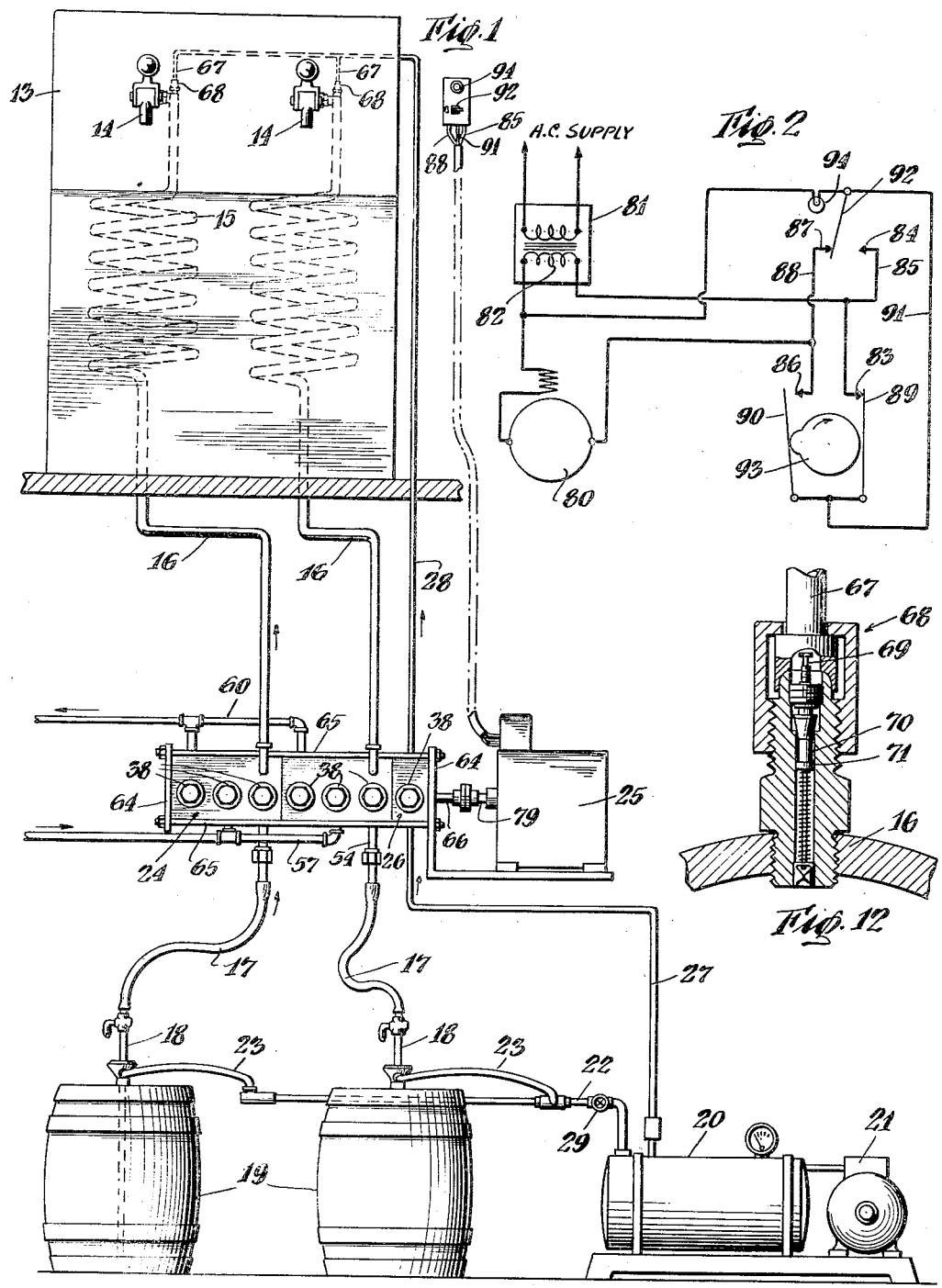

Patented Nov. 7, 1939

2,178,559

UNITED STATES PATENT OFFICE 2,178,559

FLUID DISPENSING SYSTEM

Abraham Cohen, Brooklyn, Reginald H. T. Morgan, West Nyack, and Jack Goldstein, Flushing, N. Y., assignors to Beer Control Systems, Inc., New York, N. Y., a corporation of New York Application June 12, 1937, Serial No. 147,882

6 Claims. (Cl. 225—12)

This invention relates to liquid dispensing systems, and, more particularly, to such a system adapted for use in dispensing beer and the like characterized by means for permitting cleaning and flushing thereof and constitutes an improvement upon the devices disclosed in U. S. patents to Cohen, Nos. 2,022,951 and 2,022,952, of December 3, 1935.

A general object of the invention is the provision of such a system and associated apparatus which permits ready and efficient draining of the liquid to be dispensed, such as beer, in the lines back into the supply or kegs, flushing the lines with water and/or cleaning fluid and draining thereof to condition the lines for again receiving the liquid to be dispensed, all by means of simple manipulation of electrical control apparatus, and which are of simple, sturdy and economical construction, are readily adaptable to a plurality of dispensing lines at a delivery or bar unit, permit delivery of liquid or beer in an exceptionally clean condition, and avoid the necessity of manual operation, handling, attachment and detachment of hoses and lines, and other undesirable operations.

A more specific object of the invention is the provision of such a system whereby supply lines such as beer lines may be caused to drain back into a supply and the lines efficiently flushed and cleaned with water or other cleaning liquid by one simple manipulation of a switch, and the lines may be drained of water or cleansing liquid and again filled with liquid to be dispensed, such as beer, by another simple manipulation of the switch.

A further object is the provision of means in such a system whereby an operating shaft is rotated by an electrical motor one-half revolution to operate valves for efficiently draining the supply lines and filling them with water when the supply circuit of the motor is closed and then rotated the other half revolution to drain them of water and again fill them with liquid to be dispensed when the supply circuit is again closed.

Another object of the invention is the provision in such a system of a valve block unit which is of simple construction and readily assembled, utilizes the pressure of fluids such as liquids and/or gases in the system behind spring-biased valve stoppers to insure efficient closure thereof and is characterized by cams and cam followers serving as valve stems whereby relative valve operations are efficiently obtained with rotation of an operating shaft without necessitating the use of intermediate mechanical elements.

Other objects are the provision of such a system whereby gas pressure from a single source may be utilized with a plurality of dispensing faucets and a separate supply for each faucet, to drain the lines of liquid to be dispensed without causing mixture of the liquids in the plurality of dispensing lines; the provision of filtering screens in the dispensing lines so positioned as to be self-cleaning when the lines are drained of liquid to be dispensed; and to provide structural embodiments of the apparatus which are readily constructed and allow efficient use and operation thereof.

Other objects of the invention will in part be obvious and will in part appear hereinafter.

The invention accordingly comprises the features of construction, combination of elements, and arrangement of parts, which will be exemplified in the construction hereinafter set forth and the scope of the invention will be indicated in the claims.

For a fuller understanding of the nature and objects of the invention reference should be had to the following detailed description taken in connection with the accompanying drawings, in which Fig. 1 is a front elevational view with parts broken away of an installation of the liquid dispensing system of the present invention;

Fig. 2 is a diagrammatic showing of a wiring circuit including an electrical motor, control means and switch for attaining desired operations of the apparatus of the invention;

Fig. 3 is a top plan view with parts broken away of the valve block unit used in the system shown in Fig. 2;

Fig. 4 is a sectional view of the gas valve taken on line 4—4 of Fig. 3;

Fig. 5 is a sectional view of the beer valve taken on line 5—5 of Fig. 3;

Fig. 6 is a sectional view of the water valve taken on line 6—6 of Fig. 3;

Fig. 7 is a sectional view of the drain valve taken on line 7—7 of Fig. 3;

Fig. 8 is a side elevational view with parts broken away of the valve block unit shown in Fig. 3;

Fig. 9 is a diagrammatic showing of straight-line developments of cam contours depicting relationships therebetween throughout one complete revolution of the cam shaft;

Fig. 10 is a side elevational view with parts broken away and in section of the encased motor, drive shaft, and maintaining switch and operating mechanism thereof;

Fig. 11 is a sectional view taken on line 11—11 of Fig. 10; and

Fig. 12 is an enlarged sectional view with parts broken away of a check valve between the gas conduit and a liquid dispensing conduit.

Although systems of this same general character have been known, such as those disclosed in the above identified Cohen patents, they required manual operation through complex mechanism which are costly, provide undesirable opportunity for development of break-down difficulties, necessitate many alterations and much labor for installation and are not as positive in operation as is desired. These and many other difficulties are avoided by the present invention which will be more readily understood by reference to the drawings wherein like numerals refer to like parts throughout.

Referring to Fig. 1, 13 identifies a liquid dispensing unit or beer bar of usual construction comprising a plurality of dispensing faucets 14—14, connected to suitable cooling coils 15—15. In the usual construction each cooling coil is connected by a supply conduit to a bung or keg riser, fitted into a supply container or keg, and an air or gas compressor is connected to the keg to place the beer under pressure whereby it is forced up through the supply conduits to the dispensing faucets. In the present invention a supply conduit comprises a conduit 16 and a conduit 17 connected through a bung riser 18 with the interior of the keg 19. An air or gas, such as carbon dioxide, supply is stored under pressure in a tank 20 preferably by means of a compressor 21. The air or gas supply is connected through a pipe 22 and a hose 23 to the bung riser 18 for applying pressure to the contents of the keg 19.

In accordance with the present invention a valve block unit 24 is inserted in the beer supply conduits, provided with suitable water supplying and drain conduits and mounted with an electrical motor unit 25 for operating the valves therein. Preferably, the valve block unit also includes a gas or air valve 26 connected between the gas supply 20 and faucets 14—14 by conduits 27 and 28 for a purpose to be explained later. A pressure regulator or reducing valve 29 is inserted in the pipe 22 whereby gas may be supplied to the supply conduits adjacent the faucets under pressure greater than that of the beer supply.

The valve block, as will be seen by reference to Figs. 3 to 8 inclusive, contains three valve chambers 30, 31 and 32 and adjacent the end thereof is mounted the gas valve 26 also having a valve chamber 33. The valve chambers are all of similar construction, each having in the bottom thereof a valve seat 34 adapted to be engaged by a valve stopper 35 having a recess in the face thereof in which is mounted a body 36 of any suitable valve facing material. The upper end of the chamber is internally threaded at 37 to receive an externally threaded cap 38 with a ring of packing material 39 interposed between the top surface of the valve block and a flange 40 on the head of the cap 38. Cap 38 on the inner surface thereof carries a boss 41 having a centrally located bore 42 therein slidably receiving a guide pin 43 mounted on the top of the valve stopper 35. A compression spring 44 is positioned within the cap 38 to surround the boss 41 and the guide pin 43 and bear against the top of the stopper valve 35 normally to hold it against its seat 34.

Seat 34 has a centrally located passage 45 through which projects a valve stem 46 in spaced relation to the walls thereof. The valve stem 46 extends down through a hole in the valve block and is surrounded by a suitable packing gland 47 to prevent leakage of fluid around the valve stem. The lower end 48 of the valve stem may serve as a cam follower but is preferably threaded to receive an internally threaded cap or nut 49 adapted to ride against a cam and to provide for relative vertical adjustment between the cam and valve.

For convenience of reference the valve at the right end of the valve block will be termed the "beer valve", the one at the left end the "drain valve" and the one in the center the "water valve." The separate valve unit 26 will be termed the "gas valve." By reference to Fig. 4 it will be seen that conduit 27 is threaded into an inlet passage 50 communicating with the valve chamber 33 of the gas valve, with the conduit 28 threaded into an outlet passage 51 communicating with the passage 45. Thus gas pressure in the chamber 33 cooperates with the compression spring 44 normally to seat the valve stopper 35.

By reference to Fig. 5 it will be seen that the liquid or beer supply conduit 17 is connected by means of a coupling 52 to a nipple 53 threaded into a passage 54 communicating with the seat passage 45. A filter or screen disc 55 is positioned in the coupling 52 across the mouth of the nipple 53. The valve chamber 30 of the beer valve communicates by means of a passage 56 with the supply conduit 16.

Referring to Fig. 6 it will be seen that a water supply conduit 57 communicates through a passage 58 with the valve chamber 31 of the water valve and that a passage 59 communicates with the seat passage 45. The water supply conduit 57 is connected to a suitable water supply under pressure such as the usual water system.

In the drain valve structure as shown in Fig. 7 a drain conduit 60 is connected by a passage 61 to the seat passage 45.

Intercommunication between the beer, water and drain valves is obtained by means of a transverse passage 62 which communicates with the passage 56 in the beer valve, the passage 59 in the water valve and a passage 63 communicating with the valve chamber 32 of the drain valve.

A valve block unit comprising beer, water and drain valves is used for each keg supply conduit and dispensing faucet. Two system units are shown by way of example in the drawings and thus two valve block units 24 are assembled together with a gas valve unit 26 between end plates 64, 64 by means of tie rods 65—65. The end plates 64—64 are preferably extended below the valve blocks to serve as supports for the valve block unit and for a rotatable cam shaft 66 mounted below the ends of the valve stems 46—46. When more than one keg and dispensing faucet is used with a single gas valve, it is desirable to connect the gas supply conduit 28 to both beer supply conduits 16—16 adjacent the dispensing faucets 14—14 by means of branch lines 67—67. To prevent intermixing of the contents of the plurality of supply conduits 16—16 through the gas supply conduits each branch line 67 is connected into the beer supply conduit 16 through a check valve 68. As shown in Fig. 12 the check valve 68 comprises a plunger 69 having an internally bored seat member 70 against which is spring-biased a valve stopper 71 to permit gas to be forced into the conduit 16 but to prevent back flow of contents of the conduit into the gas supply conduit 28.

Upon the cam shaft 66 is mounted beer cams 72 adapted to open the beer valves once during a complete revolution of the cam shaft and to hold them open for an appreciable period of time. Water cams 73 are shaped to open the water valves once during a complete revolution of the cam shaft with more rapid action than is provided for the beer valves and drain cams 74 are adapted to open the drains once during a complete revolution of the cam shaft and to hold them open for a period of time sufficient to allow efficient draining of water or cleansing liquid from the beer supply conduits. Gas cam 75 is adapted to open the gas valve twice during a revolution of the cam shaft.

In Fig. 9 is shown straight-line developments of cam contours throughout one complete revolution of the cam shaft and the relationships therebetween. At one starting position of the cam shaft 66 it will be seen that the beer valve is held open while the drain, water and gas or air valves are closed. As the shaft starts to rotate, the air valve is opened and held open to drain the beer out of the supply conduits and is closed after the beer valve has been closed. The water valve is then opened to fill the beer supply conduit between the beer valve and the faucet. The water valve remains open when the cam shaft comes to a stop after one-half revolution so that the beer lines may be flushed out by opening the faucets and then maintained full of water over night. When it is desired to again fill the lines with beer the next day, the cam shaft is again rotated through one-half revolution which immediately opens the drain valve while the water valve is being closed and the air or gas valve is being opened. Gas or air pressure thus forces the water out through the drain and the drain and air valves are then closed after which the beer valve is opened to allow the beer supply conduit to be filled again with beer.

When it becomes necessary to substitute a full keg of beer for an empty, the cam shaft permits closure of the drain, water and air valves and the beer valve is held open. In this position when the bung riser 10 is removed from the keg, it is a simple procedure to flush out the supply conduit 17 and the bung riser by lifting a lever 76 having a forked end 77 pivotally mounted on the end of the valve stem 46 of the water valve, preferably by means of the cam follower nut 49. Intermediate its ends the lever 76 is pivoted to a support 78 mounted upon the valve block as shown in Figs. 6 and 8.

The filtering screen or strainer 55 in each beer supply line at the inlet of the beer valve screens out foreign matter such as particles of keg lining material and the like. By positioning the screen at this location in the particular system disclosed, the latter is readily freed from foreign matter that collects thereon when the beer is forced out of the beer supply conduits back into the keg by the gas pressure, preferably a daily procedure preliminary to flushing of the lines with water, and when the conduit 17 and bung riser 18 are flushed out with water.

The cam shaft 66 is coupled to a drive shaft 79 operated through a gear train by a small induction or series wound motor 80 which may operate directly from the usual A. C. supply lines but preferably at low voltage through a stepdown transformer 81. One end of the secondary winding 82 of the step-down transformer is connected to one terminal of the motor 80 and the other end is connected to a maintaining switch contact 83 and a control switch contact 84 by means of a conductor 85. The other terminal of the motor is connected to a maintaining switch contact 86 and another control switch contact 87 through a conductor 88. The maintaining switch contact 83 normally engages a biased contact 89 and the maintaining switch contact 86 normally engages a biased contact 90. The contacts 89 and 90 are connected together and by a conductor 91 to a pole 92 of a single pole doublethrow control switch which includes contacts 84 and 87.

As shown in Fig. 2 a cam 93 is adapted in one stop position to separate contacts 86 and 90 to break the supply circuit of the motor. To start the motor the pole 92 of the control switch is thrown over to make contact with contact 87. This completes the circuit from the transformer secondary winding 82 through contacts 83, 89, the conductor 91, the pole 92, contact 87 and conductor 88. As the cam rotates it permits contacts 86 and 90 to close and current is then supplied to the motor through the two pairs of maintaining switch contacts 83, 89 and 90, 86. As the cam approaches the end of one-half revolution rotation it separates contacts 83 and 89 thereby breaking the circuit supplying current to the motor. To again start the motor the pole 92 is swung over to make contact with contact 84 and current will be supplied from the transformer secondary winding 82 through conductor 85, contact 84, pole 92, conductor 91 and contacts 90 and 86. After cam 93 has again rotated through a small angle contacts 83 and 89 are permitted to close and the motor is again supplied with current through the two pairs of closed contacts 83, 89 and 90, 86. The cam 93 is adapted to be rotated from a gear train operated by the motor so that upon manual operation of the control switch the motor is caused to rotate the cam shaft one-half revolution and then to stop. Obviously other types of control switches such as a push button switch having a terminal connected to the conductor 91 adapted to make contact with both of the contacts 84 and 87 when the button is pushed may be used to perform similar functions. If desired, a pilot light 94 may be mounted on the control switch having one end thereof connected to the pole 92 and the other end thereof connected to the end of the transformer secondary winding which is connected to a motor terminal.

In Figs. 10 and 11 are shown a preferred maintaining switch and operating cam structure mounted upon the casing of the motor 80. As shown all four of the contacts 83, 86, 89 and 90 are mounted upon strips of electrically conducting metal supported by a base 95 of insulating material. Contact supporting strips 96 and 97 which carry contacts 89 and 90 are preferably resilient normally to hold the two pairs of contacts closed. They have their free ends 98 and 99 extending beyond the contacts 89 and 90 positioned to be engaged by abutments preferably comprising adjustable screws 100 and 101 mounted upon a segment 102 of insulating material pivotally supported at 103 upon a shaft 104 rotatably mounted in a bracket 105 supported upon the base 95. The outer end of the shaft 104 carries a lever arm 106 having a cam follower roller 107 adapted to cooperate with the cam 93. A coil spring 108 upon the shaft 104 continuously urges the cam follower 107 against the cam. Cam 93 in its preferred form is provided with a projection 109 and a notch 110 diametrically located so that when the cam follower 107 rides over the projection 109 abutment means 100 engages the projecting end 98 of the contact arm 96 causing the contacts 83 and 89 to separate and as the follower rides into the notch 110 abutment 101 engages the end 99 of the contact arm 97 causing the contacts 86 and 90 to separate. Thus the motor 80 is caused to stop after it has rotated the cam shaft 66, timed in rotation with the cam 93, each one-half revolution.

It will thus be seen that the objects set forth above are efficiently attained by the apparatus of the present invention and it is to be understood that the electrical control and operation of the device is not limited to the particular apparatus and control circuit shown but that the invention includes within its scope any electrical operating apparatus and control circuit which will perform similar functions with similar efficiency and simplicity and, if desired, means may be provided for mixing with the washing water a cleansing ingredient, such as suitable chemicals, for more efficiently flushing out the beer supply lines.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language might be said to fall therebetween.

Having described our invention, what we claim as new and desire to secure by Letters Patent, is:

1. In a beer dispensing system, the combination comprising beer dispensing means, a beer supply, means supplying gas under pressure to said beer supply, a beer valve, a conduit communicating between said supply and the inlet side of said valve, another conduit communicating between the outlet side of said valve and said dispensing means, a water valve, a conduit communicating with the inlet side of said water valve for supplying water under pressure thereto, a drain valve, a drain conduit connected to the outlet side of said drain valve, a passage communicating between the inlet side of said drain valve, the outlet side of said water valve and the outlet side of said beer valve, a gas supply under pressure greater than the pressure of the gas supplied to the beer supply, a conduit communicating between said gas supply and said beer conduit adjacent said beer dispensing means, a valve in said gas conduit, cams mounted upon a cam shaft for operating said valves in a predetermined manner whereby said beer valve is maintained open as said gas valve is opened to force the beer in said beer conduits to return to said beer supply, then both valves are closed and thereafter said water valve is opened to fill the conduit between said beer valve and dispensing means with water during one-half revolution of said cam shaft and said water valve is closed as said drain valve and said gas valves are opened, then both said drain and gas valves closed and thereafter said beer valve is opened during the other half revolution of said cam shaft, an electrical motor geared to said cam shaft, a circuit to supply current to said motor, means to break said circuit when said cam shaft has rotated each half revolution, and a switch to reestablish said circuit.

2. The combination of claim 1 in which the switch comprises an operating member adapted to close one of two auxiliary starting circuits which function successively to start the motor after a preceding operation has been performed thereby.

3. In a liquid dispensing system, a valve block having a plurality of valve chambers, a valve seat in each chamber, a stopper valve in each chamber for cooperation with the seat therein, abutment means in each chamber, a compression spring between each valve stopper and abutment means to urge the valve stopper toward its seat, a valve stem associated with each valve stopper extending from said block with the end thereof consituting a cam follower, a cam shaft, a plurality of cams on said shaft for engaging the ends of the valve stems selectively to operate the valves, a liquid supply inlet communicating with the chamber of one of said valves through the valve therein, a liquid supply outlet communicating directly with said valve chamber, a water supply inlet communicating directly with the chamber of another of said valves, a water supply outlet communicating with the water valve chamber through the valve therein, a drain outlet communicating with the chamber of another of said valves through the valve therein, and a passage communicating directly between the liquid supply outlet, the water supply outlet and the valve chamber of the drain valve.

4. In a liquid dispensing system, a valve block having a plurality of valve chambers, a valve seat in the bottom of each chamber, a stopper valve in each chamber for cooperation with the seat therein, a cap closing the top of each chamber, a compression spring between the valve stopper and the cap of each valve to urge the valve stopper toward its seat, a passage in each of said seats extending therebelow, a valve stem associated with each valve stopper extending through said passage from said block with the end thereof constituting a cam follower, a cam shaft, a plurality of cams on said shaft for engaging the ends of the valve stems selectively to operate the valves, a liquid supply inlet communicating with the seat passage of one of said valves, a liquid supply outlet communicating directly with the valve chamber of said valve, a water supply inlet communicating directly with the chamber of another of said valves, a drain outlet communicating with the seat passage of another of said valves, a passage intercommunicating directly between the chambers of the liquid supply and drain valves and the seat passage of the water valve, a gas supply inlet communicating directly with the chamber of a fourth valve and a gas supply outlet communicating with the seat passage of the last-mentioned valve.

5. In a liquid dispensing system, the combination comprising a valve block having a liquid supply valve chamber, a water supply valve chamber, a drain valve chamber and a gas supply valve chamber, an inlet and an outlet for each chamber, a passage communicating between the outlets of said liquid supply and water supply valve chambers and the inlet of said drain valve chamber, a valve seat in each chamber, a spring-biased valve stopper urged toward each seat, a conduit communicating between the outlet of said gas supply valve chamber and a delivery conduit having communication with the outlet of said liquid supply valve chamber, means including a cam follower associated with each valve stopper to move the latter from its seat, a rotatable cam shaft, and a plurality of cams on said shaft each adapted for engagement by one of the cam followers; said cams being respectively shaped and relatively arranged to cause during one-half revolution of said cam shaft the closed drain valve to remain closed, the open liquid supply valve to be held open for an interval and then closed, the closed gas supply valve to be opened and held open until the liquid supply valve is closed whereby gas under pressure will displace liquid in conduits connected to said liquid supply valve chamber, the opened gas supply valve then to be closed, and the closed water supply valve to be opened after the liquid supply and gas supply valves have been closed, and to cause during the other half revolution of said cam shaft the open water supply valve to be closed, the closed drain valve to be opened and held open for an interval and then closed, the closed gas supply valve to be opened and held open until the opened drain valve is closed whereby gas under pressure will displace water in the delivery conduit having communication with said liquid supply valve chamber, the opened gas supply valve then to be closed, and the closed liquid supply valve to be opened after the drain and gas supply valves have been closed.

6. In a beer dispensing system, the combination comprising a plurality of beer dispensing units each comprising a beer dispensing faucet, a beer supply, means supplying gas under pressure to said beer supply, a beer valve, a conduit communicating between said supply and the inlet side of said valve, another conduit communicating between the outlet side of said valve and said faucet, a water valve, a conduit communicating with the inlet side of said water valve for supplying water under pressure thereto, a drain valve, a drain conduit connected to the outlet side of said drain valve, and a passage communicating between the inlet side of said drain valve, the outlet side of said water valve and the outlet side of said beer valve, a gas supply under pressure greater than the pressure of the gas supplied to each beer supply, a conduit communicating between said gas supply and the beer conduits adjacent each of the faucets through a gas valve in the conduit and a check valve at each of the beer conduits, cams mounted upon a cam shaft for operating said beer, water and drain valves for each beer dispensing unit and the gas valve in a predetermined manner whereby said beer value is maintained open as said gas valve is opened to force the beer in said beer conduits back into said beer supply, then both valves are closed and thereafter said water valve is opened to fill the conduit between said beer valve and dispensing means with water during one-half revolution of said cam shaft and said water valve is closed as said drain valve and said gas valves are opened, then both said drain and gas valves closed and thereafter said beer valve is opened during the other half revolution of said cam shaft, an electrical motor geared to said cam shaft, a circuit to supply current to said motor, means to break said circuit when said cam shaft has rotated each half revolution, and a switch to reestablish said circuit.

ABRAHAM COHEN.
REGINALD H. T. MORGAN.
JACK GOLDSTEIN.